US012682011B2

(12) United States Patent
Ying et al.

(10) Patent No.: US 12,682,011 B2
(45) Date of Patent: Jul. 14, 2026

(54) METHODS AND SYSTEMS FOR DATA FEATURE EXTRACTION

(71) Applicant: HUAWEI TECHNOLOGIES CO., LTD., Shenzhen (CN)

(72) Inventors: Bidi Ying, Kanata (CA); Xu Li, Kanata (CA); Chenchen Yang, Guangdong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/019,999

(22) Filed: Jan. 14, 2025

(65) Prior Publication Data

US 2025/0156500 A1 May 15, 2025

Related U.S. Application Data

(63) Continuation of application No. PCT/CN2022/108296, filed on Jul. 27, 2022.

(51) Int. Cl.
G06F 18/2132 (2023.01)
(52) U.S. Cl.
CPC ................................ G06F 18/2132 (2023.01)
(58) Field of Classification Search
CPC .................................................... G06F 18/2132
USPC .......................................................... 707/736
See application file for complete search history.

(56) References Cited

U.S. PATENT DOCUMENTS

| | | | | |
|---|---|---|---|---|
| 10,599,478 | B1 * | 3/2020 | Ghare | G06F 9/505 |
| 12,387,512 | B1 * | 8/2025 | Sureka | G06V 10/25 |
| 2004/0167785 | A1 * | 8/2004 | Kimura | G06F 18/20 |
| | | | | 704/500 |
| 2016/0100314 | A1 | 4/2016 | Chung et al. | |
| 2016/0164682 | A1 * | 6/2016 | Hartloff | G06V 40/50 |
| | | | | 713/186 |
| 2020/0394332 | A1 | 12/2020 | Jakobsson et al. | |
| 2025/0181253 | A1 * | 6/2025 | Cella | G05B 19/4185 |

FOREIGN PATENT DOCUMENTS

| | | | | |
|---|---|---|---|---|
| CN | 103198324 | A * | 7/2013 | |
| CN | 110473140 | A * | 11/2019 | G06N 20/00 |
| CN | 114154532 | A * | 3/2022 | G06N 3/045 |

OTHER PUBLICATIONS

J.H. Wang, X.L. Zuo, W.L., Zuo, T. Peng, "Subjective Bayes Method for Word Semantic Similarity Measurement", 2013 IEEE 13th International Conference on Data Mining Workshops, pp. 971-977.

* cited by examiner

*Primary Examiner* — Kuen S Lu

(57) ABSTRACT

There is provided systems and methods for data feature extraction based on feedback from a network. The system may be used generally to enable feature-specific network operations, including one or more of access control, data compression and selective encryption. Further, embodiments provide methods and systems for data compression based on feature similarity and may include privacy protection.

20 Claims, 7 Drawing Sheets

200

202 Receive a request for feature extraction.

204 Extract a data feature, the feature based on feedback from a feature validation center.

206 Send the data feature to the feature validation center.

208 Validate the data feature to obtain a set of valid data features.

210 Send the set of valid data features to a compression controller.

212 Select a compression solution based on an input.

214 Send the compression solution to a parameter configuration function

216 Generate a parameters configuration based on the compression solution.

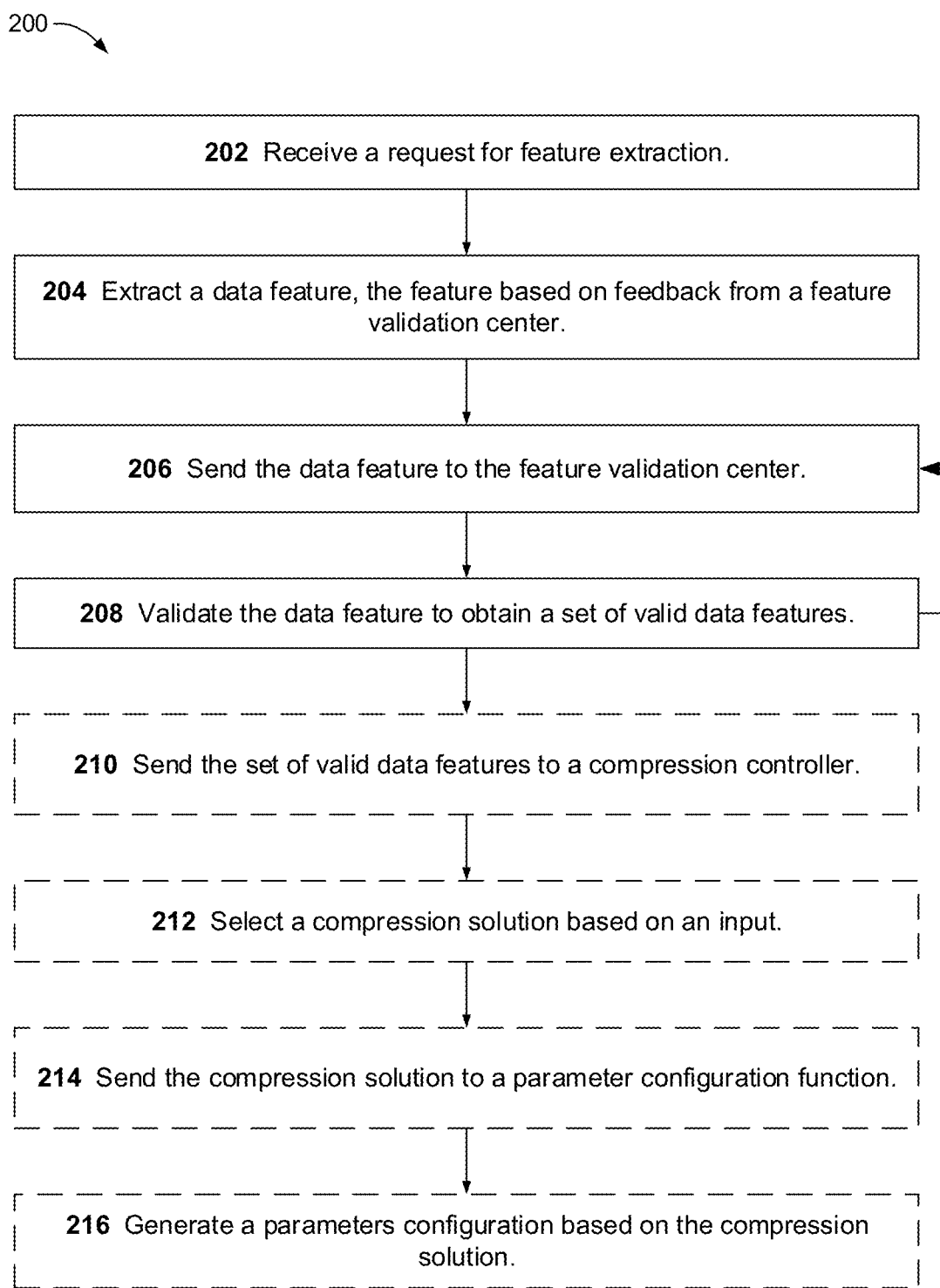

200

202 Receive a request for feature extraction.

204 Extract a data feature, the feature based on feedback from a feature validation center.

206 Send the data feature to the feature validation center.

208 Validate the data feature to obtain a set of valid data features.

210 Send the set of valid data features to a compression controller.

212 Select a compression solution based on an input.

214 Send the compression solution to a parameter configuration function.

216 Generate a parameters configuration based on the compression solution.

Receive Extracted Data Feature
302

Similarity
Calculation
304

Compare
Similarity Value
with Threshold
306

—YES—

—NO—

Generate
Compression Policy
308

Extract
Data Feature
310

400 ⌐

402 Receive a data feature.

404 Validate the received data feature.

406 Generate a privacy indication and obtain a set of valid data features for the validated data feature.

600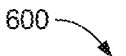

| Data Consumer 102 | Feature Extraction Router 106 | Access Controller 112 | Feature Validation Center 108 | Compr. Controller 110 | Param. Config. Func. 114 |
|---|---|---|---|---|---|

Service Request 602

Data Feature Extraction 604

Data Feature Validation Request 606

Data Feature Similarity Calculation 608

Data Feature Validation Response 610

Access Request 612

Access Response 614

Service Response 616

Compression Request 618

Compression Policy Generated 620

Compression Response 622

Parameter Request 624

Configuration Message 626a

Configuration Message 626b

METHODS AND SYSTEMS FOR DATA FEATURE EXTRACTION

CROSS-REFERENCE TO RELATED APPLICATIONS

This application is a continuation of International Application No. PCT/CN2022/108296, filed on Jul. 27, 2022, entitled "Methods and Systems for Data Feature Extraction" which is hereby incorporated by reference in its entirety.

TECHNICAL FIELD

The present disclosure pertains to the field of communication networks, and in particular to systems and method for data feature extraction.

BACKGROUND

Open mobile alliance (OMA) download digital rights management (DLDRM) concentrates on download digital rights management (DRM) (for example, content containers for downloadable objects, and DRM key and rights management). OMA DLDRM adopts the 3rd generation partnership project (3GPP) file format for storage of protected streams and the packet switched streaming service (PSS) protected streaming format. OMA DLDRM also employs the protected streaming format, which indicates that selective encryption is used to support OMA DLDRM and defines how streams that are only partially encrypted can be reconstructed with sufficient quality. An objective of these selected formats is to reduce computational complexity. 3GPP also provides several options for supporting the security of streaming. Current literature discuses that network nodes can process data content in order to achieve artificial intelligence (AI) training and data transmission/data compression. From the above, it is noted that there is a trend that a network may process data (for example performing action that may include one or more of selective encryption, data compression and data processing) in some scenarios.

Feature extraction is a process of dimensionality reduction by which an initial set of raw data is reduced to smaller more manageable groups of data for further processing. Feature extraction involves reducing the number of resources required to describe a large set of data. When performing analysis of complex data one of the major problems stems from the number of variables involved. Furthermore, feature extraction is a general term for methods of constructing combinations of the variables to get around these problems while still describing the data with sufficient accuracy. For example, when the input data to be processed is too large and suspected to be redundant, this input data can be transformed into a reduced set of features. The selected features can be expected to contain the relevant information from the input data, so that the desired task can be performed by using this reduced representation, for example the selected features, instead of the complete initial data.

Feature extraction can be useful to reduce the number of resources needed for processing the data typically without losing important or relevant information. Implementations in the prior art extract data features (for example, based on frequency of occurrence) without considering the usefulness of these extracted data features. As such, these extracted data features may not be the most useful and thus may result in poor performance of network operations (for example when a feature is based on access control or data compression).

Some literature indicates that 3-dimensional (3D) hologram technology can be a potential scenario in future communication networks. 3D hologram technology is a next-generation media technology that can present gestures and facial expressions by means of a holographic display. The content to be displayed may be obtained by means of real-time capture, transmission, or 3D rendering techniques. It would be understood that plural 3D hologram displays can generate a high or significant amount of data. Storage, transmission and processing of such a high-volume of data can pose a negative impact on network performance and may also result in a scalability problem.

Various data compression methods have been proposed particularly for data in transmission, storage, and in-network processing. Currently, lossy compression algorithms where the original data cannot be retrieved from the compressed data and the data size is reduced permanently by eliminating the redundant data, are better used in 3D hologram displays. Traditional lossy compression methods usually randomly compress information, which may be detrimental to data analytics. In order to attempt to optimize data compression, current lossy compression methods exploit data features (e.g., significant data or interesting information related to human-contextual property) in order to attempt to maximize compression gain while avoiding important information loss. Current lossy compression techniques can have several issues. For example, as a compression solution is generated or selected based on data features, the accuracy of feature extraction can be a key point to achieve a good compression performance. In addition, currently feature extraction is based on a data consumer's requirements, which may have one or more of unusual features, specific features and abnormal features. This may lead to another issue, given that static compression matching can be infeasible for features that are unusual or specific or abnormal.

Accordingly, there is a need for new methods and systems associated with data feature extraction to enable feature-specific network operations, which may include data compression or access control) in future networks, that are not subject to one or more limitations of the prior art.

This background information is provided to reveal information believed by the applicant to be of possible relevance to the present disclosure. No admission is necessarily intended, nor should be construed, that any of the preceding information constitutes prior art against the present disclosure.

SUMMARY

An object of embodiments of the present disclosure is to provide methods and systems for data feature extraction.

An aspect of the disclosure provides a system of data feature extraction. The system includes a feature extraction router and a feature validation center, wherein each of the feature extraction router and the feature validation center have one or more associated memories storing instructions. Execution of the instructions by one or more associated processors results in the feature extraction router being configured to receive a request for feature extraction from a data consumer, extract a data feature in response to the request and send the data feature to the feature validation center. Execution of the instructions by one or more associated processors results in the feature validation center being configured to determine whether the data feature belongs to a feature set, wherein the feature set includes existing data features provided by a third party off-line, upon determination that the data feature does not belong to the feature set, generate a feedback which indicates potential data features, wherein the potential data features are associated with the data feature and the existing data features, and send the feedback to the feature extraction router to re-extract a new data feature, and upon determination that the data feature belongs to the feature set, trigger feature-enabled network operations at least in part based on a set of valid data features, the set of valid data features is associated with the feature set and the data feature.

In some embodiments, determining whether the data feature belongs to the feature set, the feature validation center is further configured to calculate a feature similarity between the data feature and the existing data features, the feature similarity indicative of a level of similarity and upon determination that the feature similarity exceeds a threshold, determine the data feature belongs to the feature set.

In some embodiments the feature extraction router is further configured to receive the feedback and re-extract the new data feature with respect to the feedback. In some embodiments, wherein the new data feature comprises at least one of the potential data features. In some embodiments, the set of valid data features includes at least one of a list of features IDs with respective feature similarity and a privacy indication of whether sensitive data protection, whereas the privacy indication is generated by the feature validation center.

In some embodiments, the system further comprises a function configured to implement feature-enabled network operations, the feature validation center triggering the function by sending the set of valid data features to the function. In some embodiments, the feature-enabled network operations include feature-based data compression. In some embodiments the function is a compression controller, the compression controller being configured to determine a compression solution based on at least one of an input, compression performances of existing compression solutions, and an indication from a data consumer, wherein input includes the set of valid data features and wherein the indication is indicative of whether, upon decompression, data meets necessary service requirements. In some embodiments, the compression controller is further configured to compress data based on the compression solution to obtain compressed data and send the compressed data to the data consumer and wherein in order to obtain the data from the compressed data, decompression is performed by the data consumer.

In some embodiments, the system further includes a compression controller, wherein the compression controller is configured to select a compression solution based on the feature data and send the compression solution to a parameter configuration function. The parameter configuration function is configured to generate a parameters configuration based on the compression solution.

An aspect of the disclosure provides a method for feature extraction. The method includes receiving, by a feature extraction router, a request for feature extraction from a data consumer, extracting, by the feature extraction router, a data feature in response to the request and determining, by the feature validation center, whether the data feature belongs to a feature set, wherein the feature set includes existing data features provided by a third party off-line. Upon determination that the data feature does not belong to the feature set, generating, by the feature validation center, feedback which indicates potential data features, wherein the potential data features are identified from or associated with the data feature and the existing data features and sending, by the feature validation center, the feedback to the feature extraction router to re-extract a new data feature. Upon determination that the data feature belongs to the feature set, triggering, by the feature validation center, feature-enabled network operations at least in part based on a set of valid data features, the set of valid data features is associated with the feature set and the data feature.

In some embodiments, when determining whether the data feature belongs to the feature set, the method further includes calculating, by the feature validation center, a feature similarity between the data feature and the existing data features, the feature similarity indicative of a level of similarity and upon determination that the feature similarity exceeds a threshold, determining, by the feature validation center, the data feature belongs to the feature set.

In some embodiments, the method further includes receiving, by the feature extraction router, the feedback and re-extracting, by the feature extraction router, the new data feature with respect to the feedback. In some embodiments, the new data feature includes at least one of the potential data features.

In some embodiments, the set of valid data features includes at least one of a list of features IDs with respective feature similarity and a privacy indication of whether sensitive data protection, whereas the privacy indication is generated by the feature validation center.

In some embodiments, the method further includes triggering, by the feature validation center, a function configured to implement feature-enabled network operations by sending the set of valid data features to the function. In some embodiments, the feature-enabled network operations include feature-based data compression. In some embodiments, the function is configured as a compression controller, the method further includes determining, by the compression controller, a compression solution based on at least one of an input, compression performances of existing compression solutions, and an indication from a data consumer, wherein the input includes the set of valid data features and wherein the indication is indicative of whether, upon decompression, data meets necessary service requirements.

In some embodiments, the method further includes compressing, by the compression controller, data based on the compression solution to obtain compressed data and send the compressed data to the data consumer, wherein in order to obtain the data from the compressed data, decompression is performed by the data consumer.

An aspect of the disclosure provides a method for data feature validation. The method includes receiving, by a feature validation center, a data feature from a feature extraction router and determining, by the feature validation center, whether the data feature belongs to a feature set, wherein the feature set includes existing data features provided by a third party off-line. Upon determination that the data feature does not belong to the feature set, generating, by the feature validation center, feedback which indicates potential data features, wherein the potential data features are identified from or associated with the data feature and the existing data features and sending, by the feature validation center, the feedback to the feature extraction router to re-extract a new data feature. Upon determination that the data feature belongs to the feature set, triggering, by the feature validation center, feature-enabled network operations at least in part based on a set of valid data features, the set of valid data features is associated with the feature set and the data feature.

In some embodiments, when determining whether the data feature belongs to the feature set, the method further includes calculating, by the feature validation center, a feature similarity between the data feature and the existing data features, the feature similarity indicative of a level of similarity and upon determination that the feature similarity exceeds a threshold, determining, by the feature validation center, the data feature belongs to the feature set.

In some embodiments, the new data feature comprises at least one of the potential data features.

In some embodiments, the set of valid data features includes at least one of: a list of features IDs with respective feature similarity; a privacy indication of whether sensitive data protection, whereas the privacy indication is generated by the feature validation center.

An aspect of the present disclosure provides a device for data feature validation. The device includes a transceiver module, configured to receive a data feature from a feature extraction router and a processing module, configured to determine whether the data feature belongs to a feature set, wherein the feature set includes existing data features provided by a third party off-line. Upon determination that the data feature does not belong to the feature set, generate, by the processing module, feedback which indicates potential data features, wherein the potential data features are identified from or associated with the data feature and existing data features and send, by the transceiver module, the feedback to the feature extraction router to re-extract a new data feature. Upon determination that the data feature belongs to the feature set, trigger, by the processing module, feature-enabled network operations at least in part based on a set of valid data features, the set of valid data features is associated with the feature set and the data feature.

In some embodiments, wherein the processing module, configured to calculate a feature similarity between the data feature and the existing data features, the feature similarity indicative of a level of similarity; upon determination that the feature similarity exceeds a threshold, the processing module, configured to determine the data feature belongs to the feature set.

In some embodiments, the new data feature comprises at least one of the potential data features.

In some embodiments, the set of valid data features includes at least one of: a list of features IDs with respective feature similarity; a privacy indication of whether sensitive data protection, whereas the privacy indication is generated by the feature validation center.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Further features and advantages of the present disclosure will become apparent from the following detailed description, taken in combination with the appended drawings, in which:

FIG. 2 depicts a method for feature extraction, according to embodiments.

FIG. 6 depicts a procedure for data compression, according to embodiments.

It will be noted that throughout the appended drawings, like features are identified by like reference numerals.

DETAILED DESCRIPTION

Figure 1:
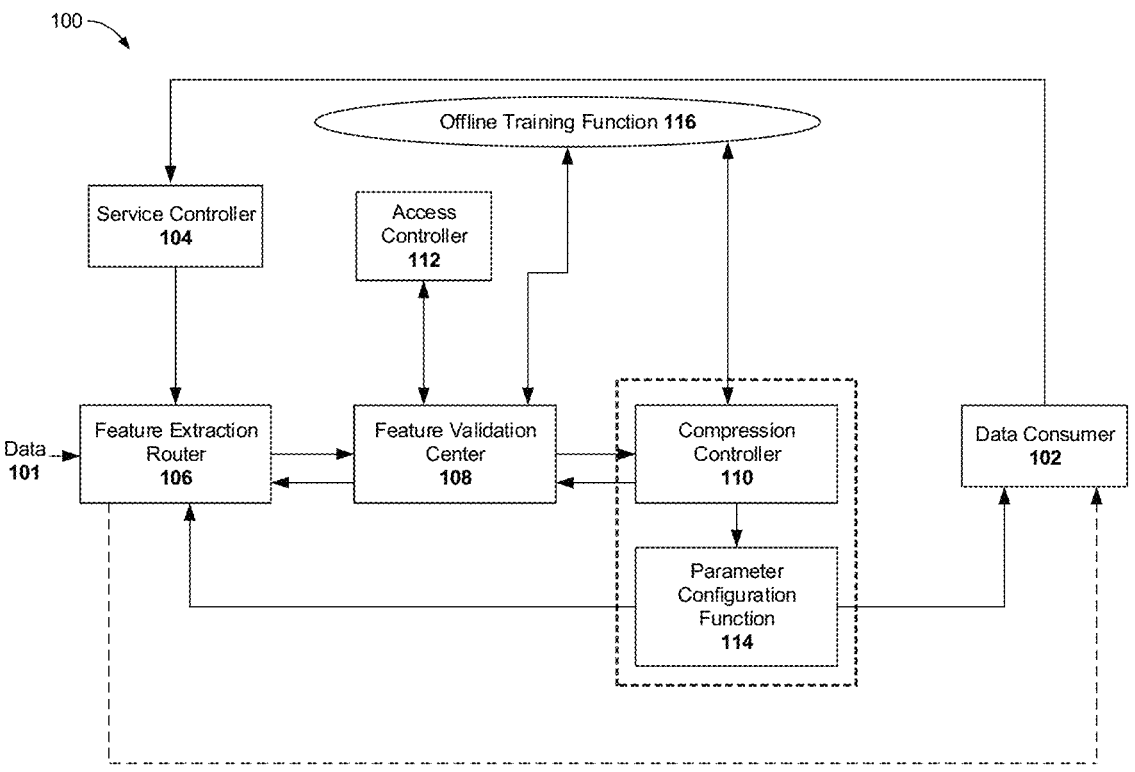
FIG. 1 depicts a system for feature extraction as can be applied to data compression, according to embodiments.

Embodiments of the present disclosure describe a system for data feature extraction. The system may be used generally to enable feature-specific network operations, for example one or more of access control, data compression and selective encryption. Further, embodiments of the present disclosure provide a method of data compression based on feature similarity. The method may provide privacy protection and may be used for one or more of unusual features, specific features and abnormal features.

It is to be understood that while data compression may be used throughout this disclosure, it is purely being used as an example application of embodiments of the present disclosure. Those of skill in the art will reasonably appreciate that embodiments of the present disclosure will not be limited to data compression.

According to embodiments of the present disclosure there is provided a system for data feature extraction. The system is based on feedback from a network, and network actions, for example, data compression, based on feature similarity. The system includes a feature extraction router and a feature validation center. The feature extraction router is configured to perform data feature extraction in relation to the received data, and the feature validation center is configured to perform feature validation, and determine whether to generate feedback for re-extraction of a data feature according to the validation result. It will be readily understood that the functions of these components may be deployed or enable by different parties, such that these parties may not trust each other. In this type of scenario there will need to be a form of validation of the actions performed, for example using a third-party action confirmation or a decentralized form of action confirmation.

According to embodiments, when a data consumer transmits a request to the system for feature extraction, the system extracts from data which may be requested by the data consumer to obtain a data feature, validates the data feature (the data feature can also be referred to as extracted data feature), and subsequently triggers feature-enabled network operations. Feature-enabled network operations can include access control or data compression or other action that may require feature extraction. For access control, the feature validation center can send the extracted data feature to an access controller in order to request control data access. For data compression, the feature validation center can send a list of feature IDs with feature similarity to a compression controller. The compression controller can subsequently perform data compression based on the feature similarity. As previously noted, access control and data compression are only example use cases associated with the data feature extraction and data feature validation associated with the instant disclosure, and the techniques disclosed herein may be used generally to enable feature-specific network operations.

According to some embodiments, the system of the present disclosure may further include other network functions. These other network functions may include for example a compression controller, a parameter configuration function, an access controller, an offline training function, a service controller, and a data consumer.

FIG. 1 depicts a system 100 for data feature extraction from data that can be applied to data compression of the data, in accordance with embodiments. With further reference to FIG. 1, after a data consumer 102 requests a service from a service controller 104, another request, which includes an indication of feature extraction, is sent to a feature extraction router 106. The feature extraction router 106 then extracts data features from the data.

This iterative process is further discussed below. Upon extraction of the data feature, the feature extraction router 106 sends the extracted data feature to the feature validation center 108 for feature validation. During data feature validation, the feature validation center 108 validates whether the extracted data feature belong to a feature set which can be provided or generated via offline training. The feature set may comprise existing features (e.g., wherein an existing data feature can be a data feature identified during offline learning, wherein these existing data features are provided by offline training function 116). In an optional manner, the feature validation center 108 calculates a feature similarity between the extracted data feature and the existing data feature and upon determination that the feature similarity exceeds a threshold, it is determined the data feature belongs to the feature set. The feature similarity can describe this level of similarity of the extracted data feature and the existing data features (e.g., wherein an existing data feature can be a data feature identified during offline learning, wherein these existing data features are provided by offline training function 116). If the extracted data features belong to the feature set the feature validation center 108 triggers feature-enabled network operations at least in part based on a set of valid data features, wherein the set of valid data features is associated with the feature set and the extracted data feature. The set of valid data features includes a list of feature IDs with respective feature similarity. The feature validation center 108 can trigger the feature-enabled network operations by sending the set of valid data features to a compression controller 110. Else, namely the extracted data feature does not belong to the feature set the feature validation center 108 generates and sends feedback regarding same to the feature extraction router 106 together with a request for feature re-extraction to the feature extraction router 106. This feedback can indicate information (e.g., words, phrases or other feature in the data) which at least in part describes potential data features that may be considered for data extraction. A potential data feature that includes the information may have a high probability of being selected as a data feature for subsequent extraction. This potential data feature may be associated with the data feature selected for subsequent extraction and existing data features already known or previously extracted. The greater the similarity between the existing data features and the data feature, the more likely the extracted data feature is included in the feedback as a potential data feature for extraction. Optionally, this extracted data feature can be considered as a potential data feature.

After receiving the feedback, the feature extraction router 106 extracts a new data feature with respect to the feedback received from the feature validation center 108. For example, the new data feature is identified and may include at least one potential data feature specified in the feedback from the feature validation center. The new data feature is subsequently sent to the feature validation center 108 for verification. If this new data feature passes the verification process, the feature validation center 108 obtains a set of valid data features which includes this new data feature. Then the feature validation center 108 triggers feature-enabled network operations at least in part based on the set of valid data features, the set of valid data features including the valid data feature which includes the new data feature. In this case, it may be reasonably appreciated that the system 100 could improve the accuracy of data feature extraction as a small level of similarity between the data feature and existing data features is achieved. As can be readily appreciated, this can be an iterative process in order to identify a data feature for extraction.

In some embodiments, the feature validation center 108 may check or evaluate the extracted data feature in order to determine if this extracted data feature is related to privacy information or information relating a person. As would be readily understood, it may be desired to note or identify sensitive/interesting data, or data features related to human beings as this type of information may require a level of protection. As such, selective encryption or combined encryption and compression may be used to protect sensitive/interesting data. In these instances, a privacy indication of whether sensitive/interesting data protection is required, the privacy indication is generated by the feature validation center 108, and is sent to the compression controller 110. In an optional manner, the privacy indication of whether sensitive data protection can be included in the set of valid data features together with the list of feature IDs and their respective feature similarity.

According to some embodiments, after receiving the list of feature IDs with their respective feature similarity and in some instances with the privacy indication, the compression controller 110 dynamically selects (or generates) a compression solution based on this input. This input may include the list of feature IDs with feature similarity, the privacy indication, compression performances on existing compression solutions (e.g., which may be available through an offline training function).

In some embodiments this input to the compression controller 110 may further include an indication from the data consumer 102. This indication from the data consumer 102 may indicate whether the decompressed data meets the necessary service requirements as previously defined by the request received from the data consumer 102.

According to embodiments, a parameter configuration function 114 generates and implements a parameter configuration including one or more parameters for the selected compression or compression and encryption of the extracted data feature. These parameters can be configured for the feature extraction router 106 and the data consumer 102. It may be important to note that the compression controller 110 and the parameter configuration function 114 may be deployed by the same provider. This is illustrated by the dashed box surrounding the compression controller and the parameter configuration function. However, it will be readily understood that the compression controller and the parameter configuration function may be provided by different entities, and thus suitable operative communication therebetween would be required.

In some embodiments, when the data consumer 102 accesses the required data, it may be necessary to check permissions regarding access of the required data by access control. In this instance, the feature validation center 108 can send the valid data feature with the data consumer ID (which can be associated with the data consumer 102, for example) to an access controller 112 for enabling accessing data control after feature validation.

FIG. 2 depicts a method 200 of feature extraction which may be implemented by the system 100 of FIG. 1. The method 200 includes, at step 202, receiving, by a feature extraction router, a request for feature extraction and at step 204, extracting, by the feature extraction router, a data feature (the data feature can also be referred to as extracted data feature), wherein in some embodiments, the data feature is at least in part identified based on feedback from a feature validation center. The method 200 further includes, at step 206, sending, by the feature extraction router, the extracted data feature to the feature validation center and at step 208, validating, by the feature validation center, the extracted data feature to obtain valid data features. The evaluation or assessment of the extracted data feature by the feature validation center can subsequently be feed back to the feature extraction router thereby in essence guiding data feature extraction by the feature extraction router. Specifically, the feature validation center determines whether the data feature belongs to a feature set, the feature set includes existing data features provided by a third party off-line (e.g. offline training function 116). Upon determination that the data feature does not belong to the feature set, the feature validation center generates feedback which indicates potential data features. The potential data features can be identified from or associated with the extracted data feature and the existing data feature in the feature set. The feature validation center can send the feedback to the feature extraction router in order to initiate the feature extraction router re-extracts a new data feature. Upon determination that the data feature belongs to the feature set, feature-enabled network operations are triggered, wherein the feature-enabled network operations are at least in part based on a set of valid data features, wherein the set of valid data features is associated with the feature set and the data features.

According to some embodiments, this feedback from the feature validation center can indicate information (e.g., words, phrases or other feature in the data) which describe aspects of a data feature that may be considered as a potential data feature for extraction. This information is generated by a feature validation center, wherein this information is indicative of a level of similarity between the extracted data feature and the existing data features already known or previously extracted. Feature similarity can be calculated by the feature validation center and can describe a level of similarity between the extracted data feature and the existing data feature (e.g., wherein an existing data feature can be a data feature identified during offline learning and wherein these existing data features can be provided by an offline training function). The greater the similarity between the extracted data feature and the existing data feature in the feature set, the more likely the extracted data feature is included in the feedback as a potential data feature for extraction.

In some embodiments, the set of valid data features includes a list of feature IDs with their own feature similarities. The set of valid data features further comprises a privacy indication which is generated by the feature validation center based on the data features. The privacy indication indicates of whether sensitive/interesting data protection is required for feature-enabled network operations.

In some embodiments, the method 200 further includes, at step 210, sending, by the feature validation center, the set of valid data features to a compression controller. The method 200 further includes, at step 212, selecting, by the compression controller, a compression solution based on an input, and at step 214, sending, by the compression control, the compression solution to a parameter configuration function. The method 200 further includes, at step 216, generating, by the parameter configuration function, a parameters configuration based on the compression solution. In some embodiments, the input may comprise the set of valid data features, compression performances on existing compression solutions, an indication which indicates whether the decompressed data meets the necessary service requirements as previously defined by the request received from a data consumer.

Currently, it is known that typically data feature extraction is performed by extracting data features for example simply based on frequency of occurrence, without consideration of the usefulness of the data features. In some instances, these extracted data features may not be useful. As a result, poor performance of network operations (e.g., feature based access control, or data compression) can occur. In contrast to known systems, the system of the present disclosure first extracts a data feature and subsequently validates the extracted data feature, for subsequently triggering proper or appropriate network operations. According to embodiments, after extracting the data feature, whether the data feature belong to a feature set will be determined, when the data feature does not belong to the feature set, feedback will be generated, it is the feedback from the feature validation center to the feature extraction router that can improve the accuracy or usefulness of a data feature being extracted. This interaction between the feature extraction router and the feature validation center can be an iterative process in order to improve upon one or more extracted data features enabling improved network operations, for example data compression.

According to embodiments of the present disclosure provides a method for feature validation. With reference to the system as illustrated in FIG. 1, the feature extraction router 106 extracts a data feature that is subsequently sent to the feature validation center 108. The process performed by the feature validation center includes determining whether the extracted data feature belongs to a feature set or not. This feature set can include one or more existing or previously extracted data features which occurred during operation of the system and/or may include existing data features that are identified during off-line learning.

Figure 3:
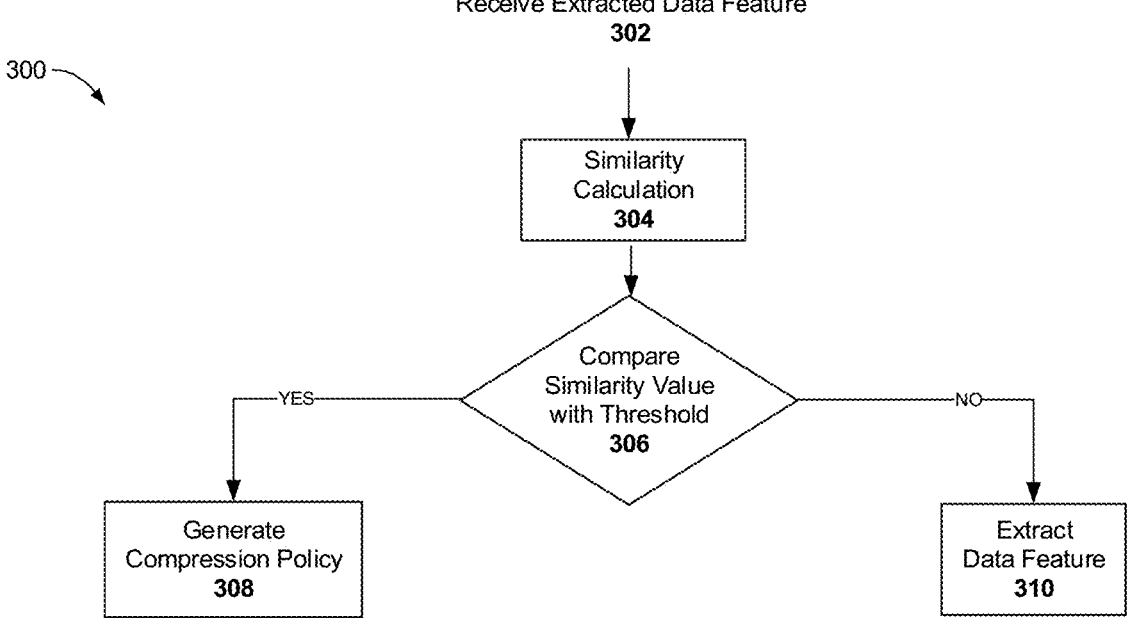
FIG. 3 depicts a flowchart for feature validation, according to embodiments.

FIG. 3 provides a flowchart 300 for feature validation. It may be helpful to note that an offline training function, for example as illustrated in FIG. 1 can be used to develop or create the feature set, wherein the feature set includes one or more data features, wherein each data feature can be associated with a feature ID and feature content.

Referring now to FIG. 3, the extracted data features 302 from the feature extraction router, for example feature extraction router 106 of FIG. 1, will be identified or evaluated in order to determine, at step 304, whether they belong to a feature set or not, through comparisons of feature similarity values with a threshold. Data features from this feature set may be provided by the offline training function 116 of FIG. 1 or may be identified during operation of the system and deemed to be suitable for inclusion in the feature set. Subsequently two options then follow upon the evaluation of the comparison.

In some embodiments, the feature validation center 108 calculates the level of data feature similarity between the data features 302 and one or more of the data features included in the feature set, at step 304. This feature set can include data features provided by the offline training function 116, for example. During the determination of similarity, feature validation center checks whether the feature similarity between the extracted data features 302 and the feature set exceeds a threshold at step 306. If the threshold is exceeded, the feature validation center 108 sends an indication of feature similarity together with the feature ID that can be associated with the particular data feature associated with the feature set, to the compression controller 110. Based on this information, the compression controller 110 subsequently generates a compression policy at step 308. If the level of similarity does not exceed the threshold, the feature validation center 108 sends a feedback to the feature extraction router 106 for the continuation of data feature extraction at step 310.

In some embodiments, a knowledge-based method or other similarity estimation method may be used to calculate feature similarity. For example, methods for similarity estimation can be associated with the use scatter plots, statistical techniques and piecewise linear interpolation. In some embodiments, subjective Bayes method to model concept semantic similarity and obtain semantic similarity of related words can be used. It will be readily understood that other concepts of similarity estimation can be used and would be readily understood by a worker skilled in the art.

In some embodiments, the feature validation center 108 checks the extracted data feature to determine whether the extracted data feature is related to privacy information or information of a natural person (i.e., a human being). It may be important to note that it is typically desired that sensitive or personal data associated with data features and data features related to human beings should be protected. As such, selective encryption or encryption joint compression or other encryption methods may be used to protect such sensitive or personal data.

Figure 4:
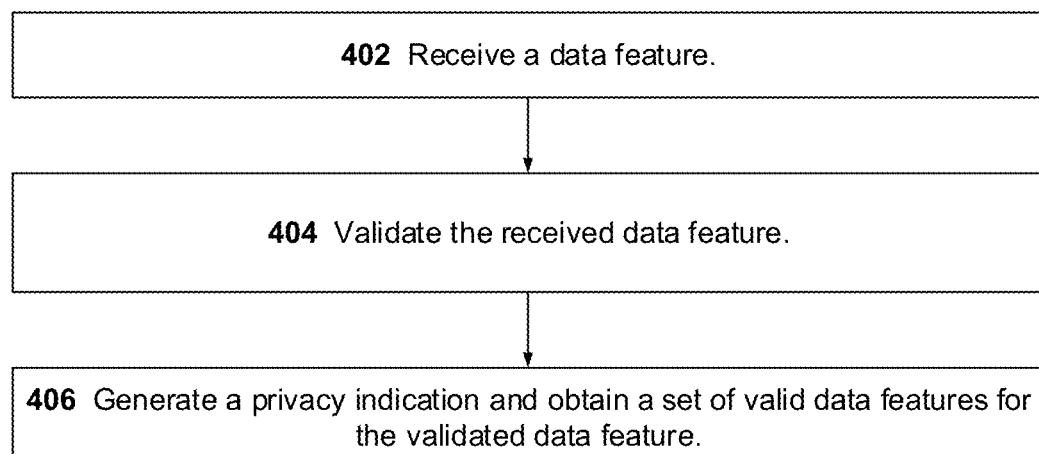
FIG. 4 depicts method at least in part based on FIG. 3, according to embodiments.

FIG. 4 depicts a method 400 for data feature validation, at least in part based on the method illustrated in FIG. 3. The method 400 includes, at step 402, receiving a data feature. The method 400 further includes, at step 404, validating the extracted data feature and at step 406, generating a privacy indication and obtain a set of valid data features for the validated data feature.

Benefits of embodiments of the system and method for data feature extraction as defined in the present disclosure include consideration of feedback from the network during subsequent extraction of data features. In this manner, the extracted features can be tuned or refined, for example based on similarities to previously extracted or known data features. This is a benefit over the prior art which does not consider any type of feedback. Further, the feedback indicates information (e.g., words, phrase) describing the potential data features, wherein this information can be generated based on feature similarity. Feature similarity can describe a level of similarity of an extracted data feature and an existing data feature (which in some instances may be identified during offline learning of data features).

According to an embodiment of the present disclosure there is provided a method for data compression. For example, with reference to the system of FIG. 1, the compression controller 110 can dynamically select or generate a compression solution based on input received from the feature validation center. This input can include a list of feature IDs with a level of feature similarity, a privacy indication, compression performance relative to existing compression solutions (which may be defined by offline training samples), and an indication from data consumer 102. The indication from data consumer 102 may indicate, upon decompression of the data transmitted to the data consumer, whether the data meets the necessary service requirements of the data consumer 102. One or more of these requirements may be provided by the data consumer in an initial service request.

Figure 5:
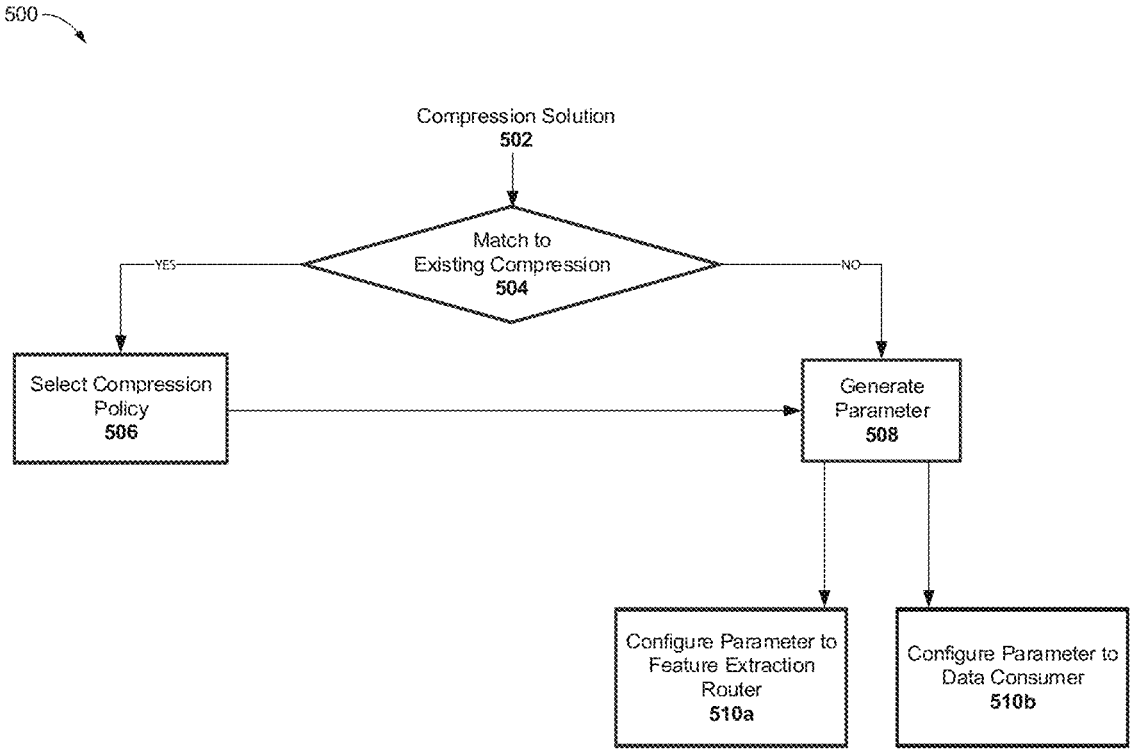
FIG. 5 depicts flowchart for data compression, according to embodiments.

Embodiments relating to the generation of a compression solution will now be discussed. Referring now to FIG. 5 there is depicted a flowchart for data compression, according to embodiments. If a compression solution 502, which is obtained from offline training samples, is matched to the received feature ID, wherein for example the data feature associated with the received feature ID has been previously compressed using the compression solution 502, the compression controller 110 selects a compression solution or policy 506 based on the received feature ID and sends the selected compression ID associated with that compression solution to the parameter configuration function 114. The parameter configuration function 114 subsequently performs parameter generation 508 and determines compression parameter configurations 510a and 510b. It is noted that in some embodiments, the parameter configuration function 114 can be merged into the compression controller 110.

In some embodiments, if the privacy indication defines that data associated with the feature ID needs privacy protection, the compression controller 110 also sends an ID of an encryption algorithm to the parameter configuration function 114 which enables the determination or evaluation of the encryption parameter configuration by the compression controller.

In some embodiments, the compression controller 110 may send partial parameters compression solution or policy to the parameter configuration function 114. The parameter configuration function 114 may generate parameters 508 for compression and if required encryption, and subsequently sends these generated parameters to the feature extraction router 106 in the form of configuration 510a and the data consumer in the form of configuration 510b. Upon received of the respective configurations 510a and 510b, the feature extraction router 106 and data consumer 102 configure the compression solution based on the received configurations.

If a compression solution determined from offline training samples is not matched to the received feature ID, the compression controller 110 determines a compression solution based on at least one of an input, compression performances of existing compression solutions and an indication from a data consumer. The input can include the set of valid data features and the indication can be indicative of whether, upon decompression, data meets the necessary service requirements. The compression controller 110 subsequently generates a preferred compression solution based on the feature similarity, the private indication, compression performances on existing compression solutions (e.g., offline training samples), and the indication from the data consumer 102. Upon the generation of the preferred compression solution a compression ID is assigned and the compression controller 110 sends the compression ID to the parameter configuration function 114 for the determination or evaluation of compression parameter configurations 510a and 510b. The compression controller 110 may also send an ID of an encryption algorithm to the parameter configuration function 114 for the determination of an encryption parameter configuration in instances where the privacy indication indicates that the required data requires privacy protection.

In some embodiments, the compression controller 110 may send partial parameters compression solution or policy to the parameter configuration function 114. The parameter configuration function 114 may generate parameters 508 for compression and if required encryption, and subsequently sends these generated parameters to the feature extraction router 106 in the form of configuration 510*a* and the data consumer in the form of configuration 510*b*. Upon received of the respective configurations 510*a* and 510*b*, the feature extraction router 106 and data consumer 102 configure the compression solution based on the received configurations.

Currently, considerations for data compression are based on the extracted feature, and as such a current compression controller obtains sensitive features which may result in the leaking of privacy of the data owner or the data consumer. As such, benefits of embodiments of the system and method for data feature compression as defined in the present disclosure include consideration relating to data compression based on a list of feature similarities, indications and compression performances on existing compression solutions, in order to better protect privacy. Moreover, embodiments may provide compression solutions for any features (including matched features and unmatched features). Unmatched features can be used to define extracted data features are not included in existing data features. Similarly, matched features means that extracted data features are included in existing data features.

According to embodiments, a procedure for data compression is provided, wherein when the data consumer 102 requests a data compression service. The network first checks whether the data consumer 102 has a permission to obtain the requested data and upon authorization, the network implements data compression to reduce the network bandwidth and communication overhead. However, due to environments wherein elements associated with a system can lack trust therebetween, for example in instances wherein the elements of the system are provided by multiple non-trusted parties or where the data consumer is untrusted with private data, it is desirous that sensitive data or personal data relating to an activity performed by an element of the system be protected. In addition, sensitive data should be protected during transmission and thus transmission can be enabled using a level of encryption.

FIG. 6 depicts a procedure 600 for data compression according to embodiments. In the procedure 600, the data consumer 102 sends a request 602 to the feature extraction router 106 through for example the service controller 104 (of FIG. 1). The request 602 can include information relating to the data consumer, for example a data consumer ID, service information indicating what data can be sent to data consumer 102, and one or more security requirements if security of the information being sent to the data consumer is necessary. In some embodiments, the request 602 may be associated with multi-view live video data, and the request 602 may also include a natural person's interactive activity that may be able to provide the data consumer 102 with information indicative of gestures, body positions and/or angles of view in the video/data.

After receiving the request 602, the feature extraction router 106 extracts a data feature (data feature extraction 604) based on the service information and the human's interactive activity. The feature extraction router 106 then sends a feature validation request 606 which includes the data feature and if required one or more security requirements, to the feature validation center 108.

The feature validation center 108 implements feature validation to obtain a set of valid data features, based on a feature set representative of known or previously extracted data features, which may be provided by an offline training function 116. The feature set can include one or more data features and an associated feature ID for each of the one or more data features.

In some embodiments, if the extracted data feature belongs to a feature set, the feature validation center 108 sends a feature validation response 610 to the feature extraction router 106, wherein the feature validation response can be indicative of the match.

In some embodiments, the feature validation center 108 calculates the level of data feature similarity 608 between the extract data feature and one or more of the data features included in the feature set. This feature set can include data features provided by the offline training function 116, for example. The feature validation center 108 can be configured to check the level of feature similarity and determine whether this level of feature similarity exceeds a threshold. For example, the threshold can be configured as a fixed threshold or a dynamic threshold which may be defined at least in part based on extracted data feature characteristics or one or more other parameters. Upon determination of the level of feature of similarity, the feature validation center sends an appropriate data feature validation response 610 to the feature extraction router 106.

In some embodiments, if the extracted data feature belongs to a feature set or if the level of feature similarity exceeds the threshold, the feature validation response 610 indicates that the extracted data feature is accepted. However, in instances where the extracted data feature neither belongs to the feature set nor the level of similarity exceeds the threshold, the feature validation response can include feedback information relating to the extracted data feature. For example, the feedback information can indicate information (e.g., words, phrases or other data features) that can describe characteristics of suitable potential data features that may be extracted. This feedback information can be generated by the feature validation center 108 based on the data feature similarity previously evaluated. For example, the higher the feature similarity of the extracted data feature, the more likely the data feature is included in the information feedback as a potential data feature.

Following the feature validation center 108 sending a feature validation response 610 to the feature extraction router 106, if the feature validation response 610 includes the feedback information, the feature extraction router 108 extracts a new data feature at least in part based on the feedback information.

According to embodiments, if the feature validation response 610 indicates that the extracted data feature is accepted, the feature validation center 108 sends an access request 612 to access controller 112. This access request 612 includes the data consumer ID, and the extracted data feature.

According to embodiments, the access controller 112 can implement access control based on the extracted data feature and send back an access response 614 to the feature validation center 108. The access response 614 can indicate the data consumer's 102 permission with respect to the requested data, which may at least in part be based on the information received in the initial service request. If the access response 614 indicates that the data consumer 102 does not have permission to obtain the requested data, the feature validation center 108 rejects the service request, and sends back a service response 616 to the data consumer 102. This response 616 indicates that the data consumer 102 does not have permission to obtain the requested service.

According to embodiments, if the access response 614 indicates that the data consumer 102 has permission, the feature validation center 108 may check the extracted data feature in order to determine if the extracted data feature includes any information that may be deemed to be private or the privacy thereof is to be protected. For example, the feature validation center can determine if the extracted data feature is related to a human being's privacy information or a human being's interesting information. If privacy of some of the information associated with the extracted data feature is desired or required, selective encryption or encryption joint compression may be used to at least protect private data associated with the extracted data feature. The feature validation center 108 then sends a compression request 618 to the compression controller 110. This compression request 618 may include the set of valid data features, a list of feature IDs with the corresponding level of feature similarity, a privacy indication indicating whether data compression requires encryption or other form of privacy protection prior to being transmitted to the data consumer.

In some embodiments, in instances where an existing compression solution is known (e.g., for example a compression solution determined or configured based on offline training samples) which is matched to the received feature ID, the compression controller 110 sends a parameter request 624 to the parameter configuration function 114. This parameter request may include compression ID, and partial parameters about compression. This parameter request may also include an encryption ID if the privacy indication shows data compression requires at least partial data protection. In some embodiments, offline training function samples may include information including feature ID, compression ID with a corresponding compression performance associated with the compression method associated with the compression ID.

In some embodiments, where a known compression solution is unavailable, the compression controller 110 is configured to determine a compression solution based on at least one of an input, compression performances of existing compression solutions and an indication from a data consumer. The input can include the set of valid data features and the indication can be indicative of whether, upon decompression, data meets the necessary service requirements. The compression controller 110 can select or generate a desired or optimum compression solution based on one or more of the feature similarity, the private indication, compression performances on existing compression solutions and an indication from the data consumer 102.

In some embodiments, the indication from the data consumer 102 may indicate whether upon decompression of the extract data feature, the extract data feature meets the requirements of the service request originally received from the data consumer 102.

In some embodiments, an existing optimization algorithm (e.g., the backpack optimization algorithm) can be used to select or identification of a desired or appropriate or optimized compression solution.

In some embodiments, in instances where the selection or generation of a suitable or optimized compression solution fails, the compression controller 110 may request information indicative of feature similarity and subsequently send a compression response 622 back to the feature validation center 108. This compression response can include a request for more feature IDs with associated levels of feature similarity between the particular selected data feature of the feature set and the extracted data feature. The process for the selection or generation of a suitable compression solution can subsequently be performed again.

After obtaining a successful compression selection/generation, the compression controller 110 sends a parameter request 624 to the parameter configuration function 114. This parameter request 624 may include a compression ID, and partial parameters relating to the selected compression solution. This parameter request 624 may also include an encryption ID for use in instances where the private indication indicates that data compression requires privacy protection of some of the information associated with the extracted data feature.

In some embodiments, the parameter configuration function 114 then generates parameters for compression (or encryption) and may send the parameters to the feature extraction router 106 (for example, through the transmission of a configuration message 626a) and the data consumer 102 (for example, through the transmission of a configuration message 626b). The configuration message 626a and 626b may provide the feature extraction router and the data consumer, respectively, with the suitable parameters for their respective configuration in line with the selected compression solution.

In some embodiments, the feature validation center can use a Text Frequency (TF) method can be used in order to determine a data feature for extraction. A TF method can be used to measure how many times a term is present in data packets. For example, the occurrence of a term in a set of data packets can be divided by the total terms present in the set of data packets in order to determine the term frequency. Subsequently, all terms can be sorted based on the term frequency and the terms with the higher frequency of occurrence, namely term frequency, can be selected as data features for extraction. In some embodiments, there may be terms that, while not the same, may be considered to have a level of similarity. The similarity level of these terms can be determined and subsequently transmitted as feedback information to the feature extraction router, thereby providing the feedback from the feature validation center to the feature extraction router, for subsequent data feature extraction.

According to embodiments, the compression controller dynamically selects or generates compression solutions based on the input, for example feature data. This input or feature data can include a list of feature IDs with a level of feature similarity, a privacy indication, compression performances relating to existing compression solutions (which may be determined by an off-line training function), and an indication from the data consumer. The privacy indication may indicate that the feature validation center is to send a list of feature IDs instead of sensitive feature contents and/or encrypt the information of the data feature that has been identified for privacy, thereby protecting privacy upon provision of a response to the request for data extraction made by a data consumer. With the input potentially including an indication of compression performances relating to existing compression solutions, suitable compression solutions for a variety of different extracted features (for example including matched-features and un-matched features) can be provided by the system.

In some embodiments, the systems and methods according to the present disclosure, wherein data features can be extracted based on feedback from a network, can be applicable to applications including internet of things (IoT) and internet of vehicles (IoV) scenarios or can be applied to applications such a satellite communication. In these types of applications, the destination identifier within a data packet may be an identifier of a user equipment (UE) or an identifier of a terminal device (for example IoT device, wearable device or vehicle device or vehicle mount device or vehicle on-board equipment.

Figure 7:
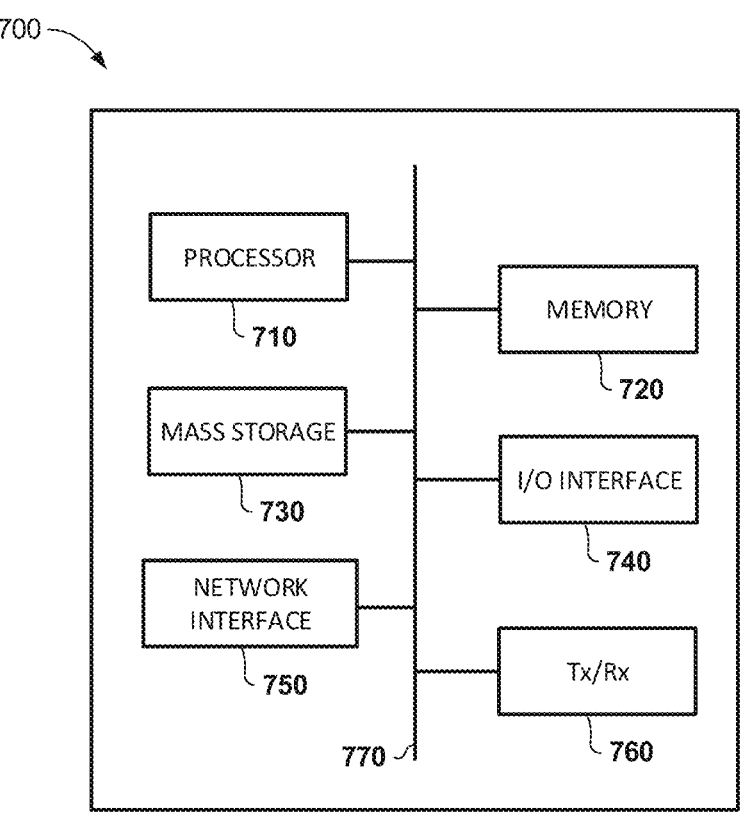
FIG. 7 depicts a block diagram of an electronic device that can be used for implementing one or more of the methods disclosed herein, according to embodiments.

FIG. 7 is a schematic diagram of an electronic device 700, such as a computing device or system, that may perform any or all of the steps of the above methods and features described herein, according to different embodiments of the present disclosure. For example, one or more of the feature extraction router, feature validation center, compression controller and parameter configuration function may be configured as an electronic device. As would be readily understood two or more of the feature extraction router, feature validation center, compression controller and parameter configuration function may be configured within in a single electronic device. Furthermore, one or more of the feature extraction router, feature validation center, compression controller and parameter configuration function may be configured as an electronic device, may be configured by multiple electronic devices.

As shown, the device includes a processor 710, memory 720, non-transitory mass storage 730, I/O interface 740, network interface 750, and a transceiver 760, all of which are communicatively coupled via bi-directional bus 770. According to certain embodiments, any or all of the depicted elements may be utilized, or only a subset of the elements. Further, the device 700 may contain multiple instances of certain elements, such as multiple processors, memories, or transceivers. Also, elements of the hardware device may be directly coupled to other elements without the bi-directional bus.

The memory 720 may include any type of non-transitory or non-transient memory such as static random access memory (SRAM), dynamic random access memory (DRAM), synchronous DRAM (SDRAM), read-only memory (ROM), any combination of such, or the like. The mass storage element 730 may include any type of non-transitory storage device, such as a solid state drive, hard disk drive, a magnetic disk drive, an optical disk drive, USB drive, or any computer program product configured to store data and machine executable program code. According to certain embodiments, the memory 720 or mass storage 730 may have recorded thereon instructions (e.g. machine readable instructions) executable by the processor 710 for performing any of the aforementioned method steps described above.

Acts associated with the methods described herein can be implemented as coded instructions in a computer program product. In other words, the computer program product is a computer-readable medium upon which software code is recorded to execute the methods when the computer program product is loaded into memory and executed by the processor of a computing device.

Acts associated with the methods described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the processor of a computing device.

Further, each step of the methods may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The invention claimed is:

1. A system for feature extraction, the system comprising a feature extraction router and a feature validation center, wherein each of the feature extraction router and the feature validation center have one or more associated memories storing instructions, wherein execution of the instructions by one or more associated processors results in:

the feature extraction router being configured to:
receive a request for feature extraction from a data consumer;
extract a data feature in response to the request; and
send the data feature to the feature validation center; and the feature validation center being configured to:
determine whether the data feature belongs to a feature set, wherein the feature set includes existing data features provided by a third party off-line;
upon determination that the data feature does not belong to the feature set, generate a feedback which indicates potential data features, wherein the potential data features are associated with the data feature and the existing data features and send the feedback to the feature extraction router to re-extract a new data feature; and
upon determination that the data feature belongs to the feature set, trigger feature-enabled network operations at least in part based on a set of valid data features, the set of valid data features is associated with the feature set and the data feature.

2. The system of claim 1, wherein when determining whether the data feature belongs to the feature set, the feature validation center is further configured to:

calculate a feature similarity between the data feature and the existing data features, the feature similarity indicative of a level of similarity; and
upon determination that the feature similarity exceeds a threshold, determine the data feature belongs to the feature set.

3. The system of claim 1, wherein the feature extraction router is further configured to:

receive the feedback; and
re-extract the new data feature with respect to the feedback.

4. The system of claim 1, wherein the set of valid data features includes at least one of:

a list of features IDs with respective feature similarity; and
a privacy indication of whether sensitive data protection, whereas the privacy indication is generated by the feature validation center.

5. The system of claim 1, wherein the system further comprises a function configured to implement feature-enabled network operations, the feature validation center triggering the function by sending the set of valid data features to the function.

6. The system of claim 5, wherein the function is a compression controller, the compression controller being configured to:

determine a compression solution based on at least one of an input, compression performances of existing compression solutions, and an indication from a data consumer;

wherein the input includes the set of valid data features; and wherein the indication is indicative of whether, upon decompression, data meets necessary service requirements.

7. The system of claim 6, wherein the compression controller is further configured to:

compress data based on the compression solution to obtain compressed data and send the compressed data to the data consumer; and wherein to obtain the data from the compressed data, decompression is performed by the data consumer.

8. A method for feature extraction, the method comprising:

receiving, by a feature extraction router, a request for feature extraction from a data consumer;

extracting, by the feature extraction router, a data feature in response to the request;

determining, by the feature validation center, whether the data feature belongs to a feature set, wherein the feature set includes existing data features provided by a third party off-line;

upon determination that the data feature does not belong to the feature set, generating, by the feature validation center, feedback which indicates potential data features, wherein the potential data features are identified from or associated with the data feature and the existing data features and sending, by the feature validation center, the feedback to the feature extraction router to re-extract a new data feature; and upon determination that the data feature belongs to the feature set, triggering, by the feature validation center, feature-enabled network operations at least in part based on a set of valid data features, the set of valid data features associated with the feature set and the data feature.

9. The method of claim 8, wherein when determining whether the data feature belongs to the feature set, the method further comprises:

calculating, by the feature validation center, a feature similarity between the data feature and the existing data features, the feature similarity indicative of a level of similarity; and upon determination that the feature similarity exceeds a threshold, determining, by the feature validation center, the data feature belongs to the feature set.

10. The method of claim 8, wherein the method further includes:

receiving, by the feature extraction router, the feedback; and re-extracting, by the feature extraction router, the new data feature with respect to the feedback.

11. The method of claim 8, wherein the set of valid data features includes at least one of:

a list of features IDs with respective feature similarity; and a privacy indication of whether sensitive data protection, whereas the privacy indication is generated by the feature validation center.

12. The method of claim 8, wherein the method further comprises triggering, by the feature validation center, a function configured to implement feature-enabled network operations by sending the set of valid data features to the function.

13. The method of claim 12, wherein the function is configured as a compression controller, the method further comprising:

determining, by the compression controller, a compression solution based on at least one of an input, compression performances of existing compression solutions, and an indication from a data consumer;

wherein the input includes the set of valid data features; and wherein the indication is indicative of whether, upon decompression, data meets necessary service requirements.

14. The method of claim 13, further comprising:

compressing, by the compression controller, data based on the compression solution to obtain compressed data and send the compressed data to the data consumer; and wherein to obtain the data from the compressed data, decompression is performed by the data consumer.

15. A method for data feature validation, the method comprising operations performed by a feature validation center and a feature extraction router, wherein each of the feature validation center and the feature extraction router includes one or more associated memories storing instructions, wherein execution of the instructions by one or more associated processors result in:

receiving, by the feature validation center, a data feature from the feature extraction router;

determining, by the feature validation center, whether the data feature belongs to a feature set, wherein the feature set includes existing data features provided by a third party off-line;

upon determination that the data feature does not belong to the feature set, generating, by the feature validation center, feedback which indicates potential data features, wherein the potential data features are identified from or associated with the data feature and the existing data features and sending, by the feature validation center, the feedback to the feature extraction router to re-extract a new data feature; and upon determination that the data feature belongs to the feature set, triggering, by the feature validation center, feature-enabled network operations at least in part based on a set of valid data features, the set of valid data features is associated with the feature set.

16. The method of claim 15, when determining, by the feature validation center, whether the data feature belongs to the feature set, the feature validation center is further configured to:

calculate, by the feature validation center, a feature similarity between the data feature and the existing data features, the feature similarity indicative of a level of similarity; and upon determination that the feature similarity exceeds a threshold, determine, by the feature validation center, the data feature belongs to the feature set.

17. The method of claim 15, wherein the set of valid data features includes at least one of:

a list of features IDs with respective feature similarity; and a privacy indication of whether sensitive data protection, whereas the privacy indication is generated by the feature validation center.

18. A device for data feature validation, the device comprising one or more associated memories storing instructions and one or more associated processors, wherein execution of the instructions by one or more associated processors results in:

a transceiver module being configured to receive a data feature from a feature extraction router;

a processing module being configured to determine whether the data feature belongs to a feature set, wherein the feature set includes existing data features provided by a third party off-line, wherein upon determination that the data feature does not belong to the feature set, generate, by the processing module, feedback which indicates potential data features, wherein the potential data features are identified from or associated with the data feature and the existing data features and send, by the transceiver module, the feedback to the feature extraction router to re-extract a new data feature; and upon determination that the data feature belongs to the feature set, trigger, by the processing module, feature-enabled network operations at least in part based on a set of valid data features, the set of valid data features being associated with the feature set and the data feature.

19. The device of claim 18, wherein the processing module, configured to calculate a feature similarity between the data feature and the existing data features, the feature similarity indicative of a level of similarity;

upon determination that the feature similarity exceeds a threshold, the processing module, configured to determine the data feature belongs to the feature set.

20. The device of claim 18, wherein the set of valid data features includes at least one of:

a list of features IDs with respective feature similarity;

a privacy indication of whether sensitive data protection, whereas the privacy indication is generated by the processing module.

* * * * *